April 9, 1929.  M. HARRIS  1,708,136
ENERGY ABSORBING DEVICE
Filed July 10, 1925  4 Sheets-Sheet 1
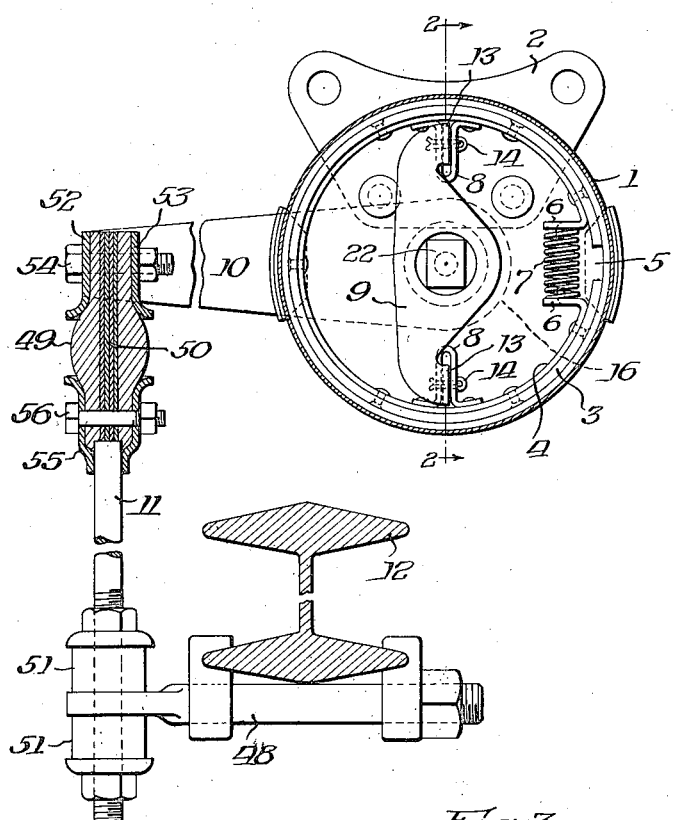
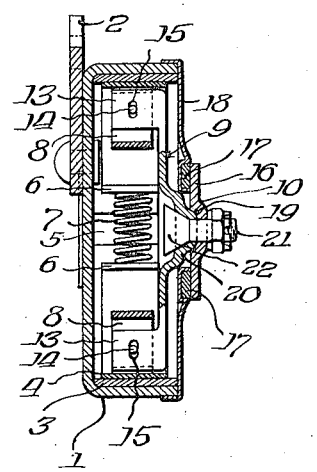
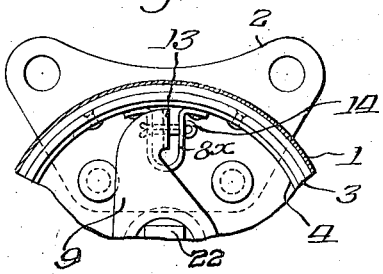
Witness:
Inventor:
Mark Harris April 9, 1929.  M. HARRIS  1,708,136
ENERGY ABSORBING DEVICE
Filed July 10, 1925   4 Sheets-Sheet 2
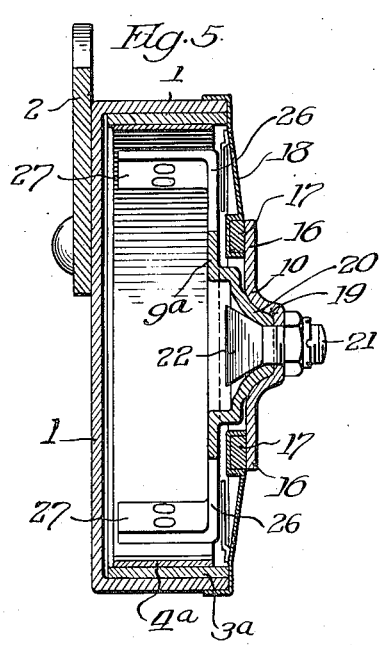
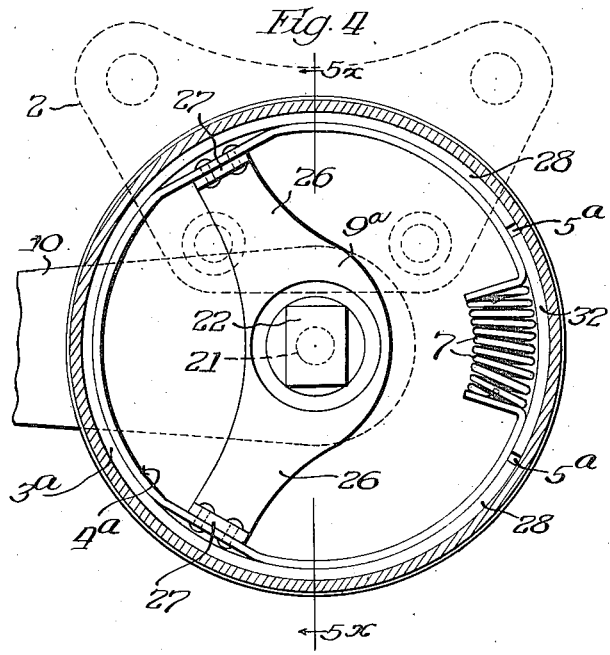
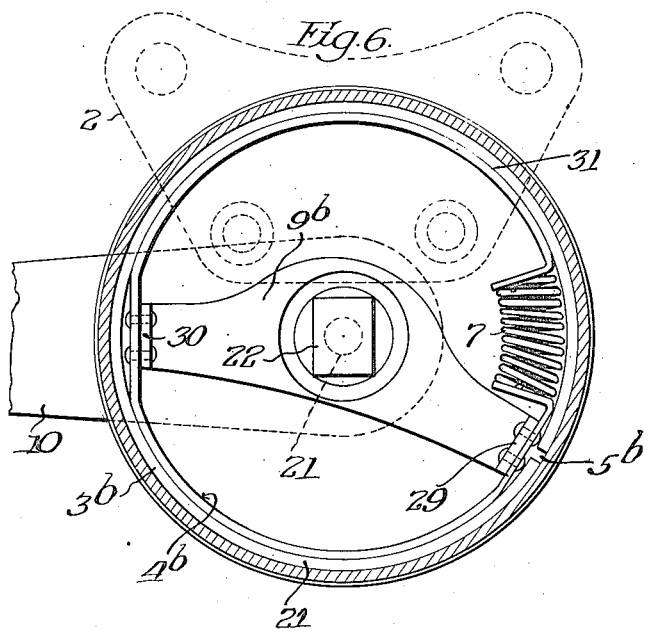
Witness
Inventor
Mark Harris
By Wilkinson, Huxley, Byron & Knight,
Attys

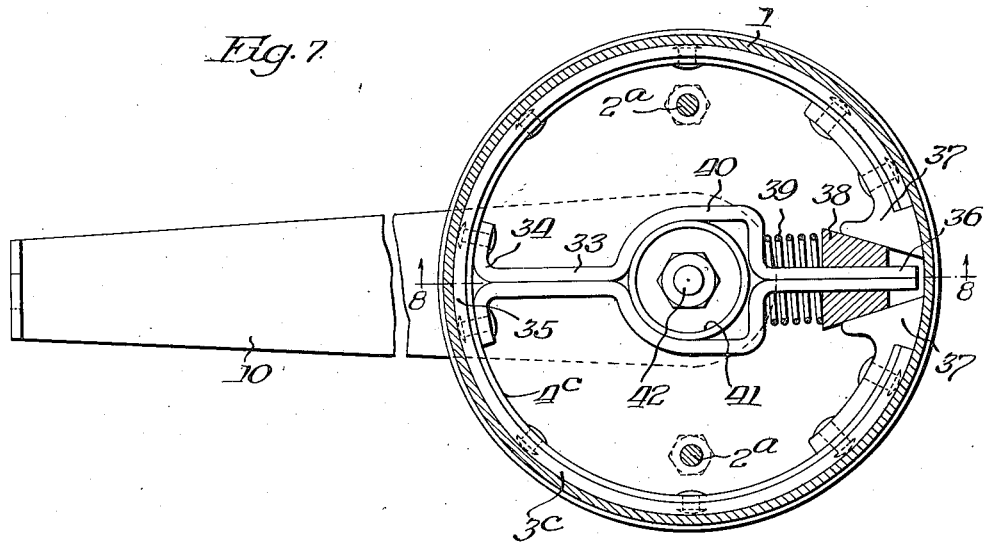
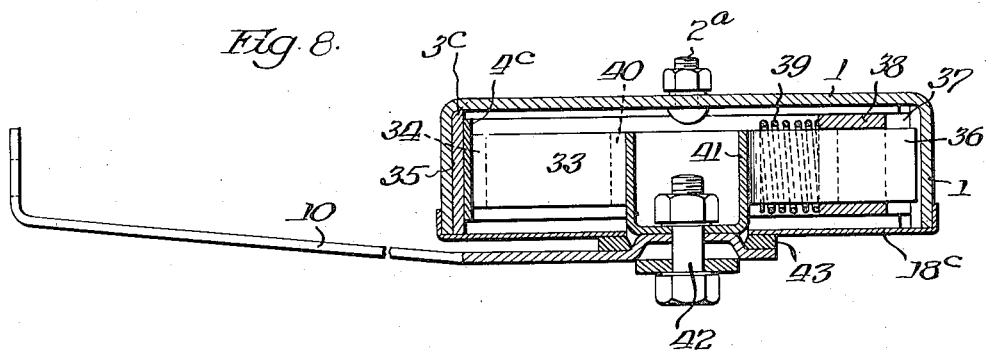

April 9, 1929.   M. HARRIS   1,708,136
ENERGY ABSORBING DEVICE
Filed July 10, 1925    4 Sheets-Sheet 4

Witness:

Inventor:
Mark Harris,

Patented Apr. 9, 1929.

1,708,136

UNITED STATES PATENT OFFICE.

MARK HARRIS, OF BIRMINGHAM, MICHIGAN, ASSIGNOR, BY MESNE ASSIGNMENTS, TO THE WAHL COMPANY, OF CHICAGO, ILLINOIS, A CORPORATION OF DELAWARE.

ENERGY-ABSORBING DEVICE.

Application filed July 10, 1925. Serial No. 42,663.

This invention relates to means adapted to be introduced between two spring-connected members of a road vehicle for the purpose of braking the action of the spring induced by unevenness in the surface traversed, and particularly to spring braking devices of the kind in which a split flexible brake band and a cylindrical brake drum, assembled with frictional bearing one against the other, are provided with controlling means connecting them with the respective members of the vehicle in a manner to cause relative rotation between them as the spring supported member moves up and down, and in which the controlling means for the flexible brake band is attached to the brake band at a point remote from one end of the brake band to leave said end free to expand under frictional drag when receiving thrust from the controlling means and thereby build up the frictional resistance to rotation commensurately with the force of spring action that is to be resisted.

One object of the invention is to so construct a spring brake of the kind described that the controlling connector for the brake band will be centered and positioned by the bearing of the brake band upon the drum and thereby avoid the use of a fixed pintle about which the brake band rotates, leaving the brake band greater freedom to expand against the drum, and particularly to distribute pressure throughout the surface of the drum even though the drag which causes expansion may occur mainly in but a portion of the friction band, and greatly simplifying the construction and avoiding bearings that have to be lubricated or any frictional relation between moving parts other than where friction is desired for resisting movement. Accordingly, one feature of the invention consists in attaching the brake band control to the brake band at a plurality of points which will center the connection within the brake band.

Another object is to adapt a spring brake of the kind described, and particularly as set forth in the first stated object, to resist the spring in both directions of spring movement, and at the same time to cause the resistance building effect in the two directions of movement to be either equal or unequal as circumstances may require; and, to this end, another feature of the invention consists in selecting the points at which the controlling connector is attached to the flexible brake band at equal distances from the respective ends of the split brake band, or at a greater distance from one end than the other.

Another object of the invention is to provide means whereby a spring braking device of the kind described, while having the capacity to control spring action induced by relatively large forces resulting from greater irregularity of road surface, will also be adapted to resist, without harshness, spring vibrations resulting from the minor effects of slight inequalities in road surface; and, to this end, a further feature of the invention consists in introducing a resilient compression element in the controlling connector of one of the friction elements, preferably the brake band; also, when needed, in introducing a special means for building up the drag of the free end or ends of the brake band, but with lost motion in the operation of the drag-increasing member so that it does not come into play until a substantial spring disturbance has taken place.

In order that the invention may be fully understood, several embodiments thereof have been illustrated and will now be described in detail in connection with the accompanying drawings. In said drawings—

Figures 1 and 2 are, respectively, an elevational view partly in section and an axial section of one embodiment of the invention; Figure 1 also including the controlling connections for the respective friction elements, one controlling connection being attached at points giving equal braking resistance in opposite directions.

Figure 3 is a detail view showing a portion of Figure 1 with dimensions that develop lost motion in the control of the friction band.

Figure 4 is an elevational view, and Figure 5 a section on the line 5ˣ—5ˣ of Figure 4, showing another embodiment of the invention in which equal braking resistance is developed in each direction of movement.

Figure 6 is a view similar to Figure 4 showing a controlling connector united with the brake band at points which will develop greater frictional resistance in one direction than in the other.

Figures 7 and 8 are, respectively, an elevational and an axial sectional view showing an embodiment of the invention in which there is a two-point connection of the control for the brake band, but in which driving thrust is imparted in each direction from an end of the brake band, and a modified means is employed for developing initial expansion of the brake band.

Figure 9:
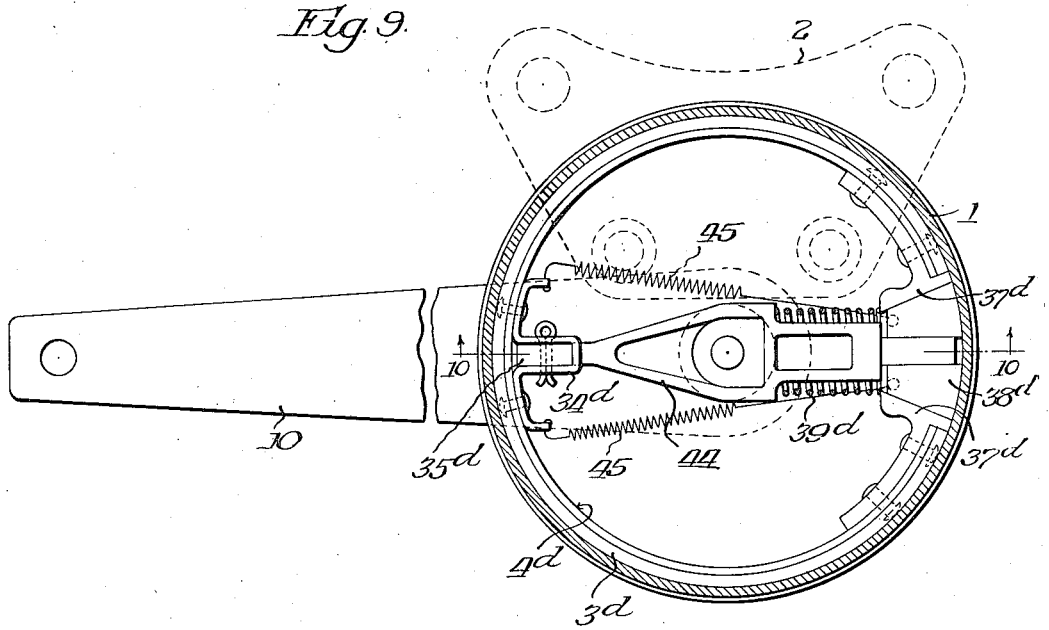
Figures 9 and 10 are views corresponding to Figures 7 and 8 showing two-point attachment with end thrust upon the brake band in opposite directions, but with a different means for establishing initial expansion of the brake band.

Referring to Figures 1 and 2, 1 represents a rigid metal drum closed at one end and having means, such, for instance, as a riveting plate 2 for mounting it upon one of two spring connected members, for instance, the body of a vehicle. 3 represents a brake band fitted within the drum 1, made of leather or other material equivalent thereto with respect to flexibility and coefficiency of friction, and having within it, and suitably united to it, a freely flexible and preferably resilient metallic liner 4. Brake band 3 is divided at 5 to render it freely extensible and contractible circumferentially, and the steel liner 4 is likewise non-continuous. It is provided with ends 6 upturned in position to receive a helical spring 7 of a capacity suited to develop a desired initial frictional contact between the brake band 3 and the inner surface of the drum. Attached to the brake band 3 through the medium of its liner 4, and by some suitable means, such, for instance, as U-shaped clips 8, is a yoke 9 which carries a crank arm 10 which is adapted to be connected through means of a connecting rod 11 (preferably of special construction to be hereinafter described) with the other of the spring connected members of the vehicle, for instance, the chassis frame 12. Yoke 9, as shown more clearly in Figure 2, has inturned ends 13 which enter the clips 8 and are there confined with some tolerance of movement, particularly in diametric direction, by means of cotter pins 14 passing through the walls of the clips and through slots 15 of the yoke ends. An important feature of the present invention resides in the fact that yoke 9 is positioned within the drum 1 by means of the brake band 3, rather than through means of a fixed post or pintle, so that there is no frictional bearing in the device except where friction is desired for purposes of resistance, and the brake band is free from restraint in expansion and contraction and in its freedom to distribute and equalize its frictional bearing throughout the contacting surfaces of the band and drum even though the expanding influence or frictional drag, resulting from the imparting of thrust to the brake band, may be greater in some parts of the band, for instance, that one of its free ends which is leading in the movement. Moreover, attachment of the motion transmitting element used for driving the brake band in the manner described, is very much simpler and more economical to produce and has greater lasting qualities than if such a member is mounted upon a fixed spindle which has to be kept lubricated.

According to Figure 3, the clip may be in the form $8^x$ with a substantial space that admits of lost motion between the yoke 9 and the clip in the direction of the circumference of the brake band, thereby restricting braking action to those spring vibrations which exceed a predetermined amplitude. It is to be assumed that the device of Figure 3 is to be otherwise constructed as shown in Figures 1 and 2.

In order to leave the yoke 9 sufficient freedom of displacement to avoid restricting the adaptation of the brake band under expansion and contraction, crank arm 10, which controls the yoke, has its inner end 16 designed to enter into flat bearing against a packing 17 carried by the cover plate 18 of the brake drum 1; and this inner end is struck up to provide a seat 19 conforming to hub 20 formed on the yoke 9, with which it is held in driving relation by means of bolt 21 having a non-circular head 22.

According to Figures 4 and 5, a yoke $9^a$ is connected with the crank arm 10, at about the geometrical center of the brake, by means of the seat 19, hub 20, and bolt 21, as in Figures 1 and 2, and the crank arm 10 has its flanged end 16 in flat bearing upon packing 17 in the drum cover 18, as in said figures; but the yoke $9^a$ has attaching arms 26 projecting on radii to one side of a diameter of the brake and meeting the steel liner $4^a$ of the brake band $3^a$ at points 27 which, while equi-distant from the ends of the brake band and the initial compression spring 7, are more remote than the points of attachment afforded by the clips 8 in Figure 1, and therefore leave free thrusting portions 28 of the brake band of greater circumferential dimension than in Figure 1. And, here, the arms of the yoke are immovably riveted to the steel liner instead of having lost motion connection therewith; bodily movement of the yoke $9^a$ with the brake band being relied upon in equalizing or distributing frictional pressure throughout the brake band when the band enlarges under the functioning of the device.

If it be desired to embody the construction of Figures 4 and 5 in an arrangement in which greater braking resistance is built up in one direction than in the other, the yoke $9^b$, as shown in Figure 6, may be connected to the steel liner $4^b$ of the brake band $3^b$ at points 29 and 30, of which the former is closely related to one end of the brake band, thereby leaving no free thrusting end beyond it, while the other point of attachment is at an intermediate point in the brake band and leaves in advance of it a free thrusting end 31 even greater than the ends 28.

Thus, in Figure 6, the braking element $3^b$, $4^b$, in rotating in one direction, will offer braking resistance commensurate with the spreading force of the spring 7 minus the relieving effect of the free end 31 dragging after the attaching point 30. While moving in the opposite direction the braking resistance will be built up even to a greater extent than movements in the form shown in Figure 4, by reason of the relatively long free end 31 which is being thrust ahead of the point 30.

In Figure 6 the friction member $3^b$ is extended past the initiating spring 7, thus increasing the total of the friction in the free thrusting end of the brake band and causing a greater building up effect and consequent expansion of the brake band.

In Figure 4 a similarly enlarged frictional drag is introduced, but it is through means of a separate friction shoe or segment 32 which laps the loading spring 7; the shoe 32 being preferably of material having a greater coefficiency of friction than the main body of the brake band $3^a$, and having its ends spaced from the ends of the brake band at $5^a$ so that it will move relatively to the latter and introduce slight delay or admit of some angular movement of crank arm 10 before it lends its resistance or friction building effect to that of the free ends 28 of the brake element.

In Figures 7 and 8 it is proposed to mount the spring brake through means of bolts $2^a$ passing through the closed end of the drum 1. The yoke may take the form of a diametric spanner 33 with one end 34 riveted to a middle point 35 of the brake element $3^c$, $4^c$, and with its other end 36 entering between the toe pieces 37 on the free ends of the brake element, while a wedge 38, normally under the influence of a spring 39 and acting against the toe pieces 37, tends to spread the brake element and thereby maintains it under desired initial frictional contact with the drum 1. Here, substantially a semi-circumference of the friction band is provided as a free dragging end under thrust in each direction, the spreading element 38 becomes the means through which to impart thrust to either ends of the band, while the end 34 transmits thrust in either direction at the middle point 35 of the band. Yoke 33 is designed with a central collar 40 through which the yoke is non-rotatably united with a hub 41 to which the crank arm 10 is non-rotatably secured by the clamping bolt 42. A dustproof packing 43 is interposed between the arm 10 and brake drum cover $18^c$, and the parts in this embodiment, as in the other embodiment herein described, are so related that the yoke and crank arm are centered solely by the bearing of one friction surface against the other, and exercise no restraint over the distribution of friction developing pressure throughout the circumference of the brake band, and involve no lubricated bearings.

Figure 10:
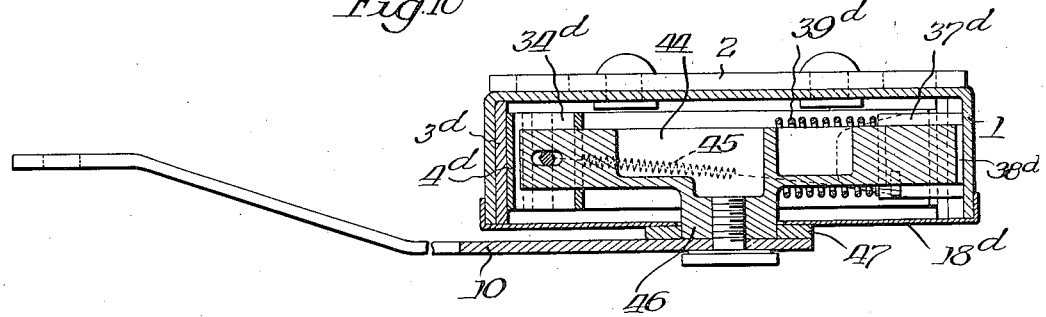

According to Figures 9 and 10, the drum 1, equipped for mounting through means of plate 2, has located within it braking mechanism which corresponds in operative principle to that disclosed in Figures 7 and 8, but is modified somewhat in details of its constituent parts. That is to say, braking element $3^d$, $4^d$, terminating in toe pieces $37^d$, has a yoke in the form of a diametrically arranged spanner 44 attached at a middle point $35^d$ through means of U-shaped clip $34^d$, and the toe pieces $37^d$ diverge outwardly to receive a wedge $38^d$ that is moved inwardly by springs 45. A spring $39^d$ mounted on the yoke 44 acts outwardly against the toe pieces $37^d$ in opposition to the inward pressure of wedge $38^d$; and the yoke 44 is provided with a solid hub 46 receiving the inner end of the crank arm 10, while an annular packing ring 47 is interposed between the crank arm and the drum cover $18^d$.

The preferred means for connecting the crank arm 10 to the vehicle member, for instance, the chassis frame 12, (Figure 1), and which means is to be understood as being applicable to the crank arm wherever the latter is disclosed in the drawings, is preferably one embodying flexibility sufficient to compensate for changing angles of the crank arm, resilient compressibility in the direction of thrust, and, preferably, also absorption of shock under loads of tension imposed upon it. Such a connecting means is shown in Figure 1, wherein a connecting rod 11, extending from a clip 48 or other approved means of connection with the chassis frame 12 or other vehicle member, is connected with crank arm 10 though means of a bulbous cushioning member 49 of rubber, vulcanized on a non-stretching base 50 of multiple ply fabric, bolted at its respective ends to the crank arm 10 and the rod 11, with the effect of securing free flexibility between the rod and the crank arm, and with resilient compressibility under loads of thrust imparted by the crank arm and substantial resistance to elongation under loads of tension; the other end of the connecting rod 11 being united with the attaching element 48 with interposition of rubber or other equivalent cushions 51 which lend further longitudinal resiliency to the connection in the direction of thrust, and also introduce resiliency in the direction of tension on the rod 11.

Cushioning member 49 is secured to the members 10 and 11 preferably by clamping its upper end between the flared flange 52, integral with the arm 10, and the flared plate 53, by means of bolt 54; and securing its lower end in the flaring socket 55 by means of bolt 56.

An important feature of the present invention resides in the fact that it provides an energy absorbing device which will assume an initial or normal position at any angle of revolution of the brake band relatively to the brake drum, and will thus function identically whether the body of the vehicle upon which the braking device is mounted is supported at a relatively high level, due to a light load, or at a relatively low level as the result of a heavy load.

I claim:

1. In an energy absorbing device, a cylindrical brake member, a brake band constructed at a point in its circumference to permit the band to expand circumferentially, said band being freely flexible radially, and means for connecting said band with one of two relatively movable members to be controlled; said connecting means being bodily movable with and attached to the band at a point in the circumference of the band which is remote from its expanding point.

2. An energy absorbing device, comprising a cylindrical brake member, a circumferentially expansible brake band in frictional bearing against said brake member, and means controlling the brake band in relative movements between said band and member; said means being rigidly attached to the brake band, free from guiding bearing upon the brake member, and bodily movable with the brake band in changes of position of the latter due to its expansion and contraction.

3. In an energy absorbing device, a cylindrical brake member having means for connecting it with one of two objects, relative movement between which is to be controlled, a brake band in frictional bearing against a cylindrical surface of said member, interrupted at a point in its circumference to render it circumferentially expansible, and means for connecting the brake band with the other of said objects; said brake band having means normally acting to expand it into an initial frictional relation to the brake member, and connecting means for said brake band being bodily movable with and attached thereto at a point remote from the point of interruption of the brake band, and being free from guiding connection with the brake member other than through means of the brake band.

4. In an energy absorbing device, a cylindrical brake member, a brake band in frictional bearing upon a cylindrical surface of said member and movable circumferentially to any position relatively thereto, means mounted upon and movable circumferentially with the brake band for expanding the brake band into initial frictional relation with the brake member, and means for connecting the brake band with an external object, the last-named means being mounted upon and movable with the brake band, and being otherwise free from bearing upon the brake member.

5. In an energy absorbing device, a brake drum, a braking element in frictional bearing against the cylindrical surface of said drum and comprising an expansible ring, a crank arm for moving said ring, and a yoke connected at a plurality of points with the ring; said ring supporting said yoke and crank arm with a center of oscillation at about the geometrical center of the ring.

6. In an energy absorbing device, a brake drum, a split brake ring in frictional bearing against said drum, a yoke connected to said ring at a plurality of points in the circumference of the ring, at least one of which is remote from the opening in the ring, said yoke being thereby supported by said ring with the center of oscillation substantially coincident with the center of the ring, and a crank arm for oscillating said yoke.

7. In an energy absorbing device, a brake drum, a friction ring mounted in said brake drum, a yoke connected to said ring at a plurality of circumferentially spaced points thereon, a cover plate for the drum having a central opening, and a crank arm having a connection with the yoke which extends through said opening and supports the crank arm on the yoke independently of the cover plate.

8. In an energy absorbing device, a brake drum, a friction ring mounted in said brake drum, a yoke connected at a plurality of points to and supported by said ring, a cover plate for said drum having a central opening and a packing surrounding said opening, and a crank arm having a connection with said yoke extending through said opening having contact with said packing.

9. In an energy absorbing device, a brake drum, an open friction ring mounted in said brake drum, a yoke supported by said friction ring with the center of oscillation approximately coincident with the geometrical center of the ring, said yoke having arms through which it is connected with said ring at a plurality of circumferential points on the ring, both of which are remote from the opening in the ring.

10. In an energy absorbing device, a cylindrical brake member, a circumferentially expansible brake band in friction bearing against said member, and an independently-movable segment of brake band in bearing against said brake-member, and having a different degree of resistance.

11. In a vehicle spring retarder, a drum, a braking member in said drum comprising a flexible annulus capable of circumferential expansion, and an arm in said drum adapted to move said annulus, and connected to said annulus in a manner to impart a circumferential thrust thereto while leaving a leading end and intermediate parts thereof free to frictionally oppose such thrust, said annulus expanding under the action of the friction contact with said drum.

12. In a vehicle spring retarder, a drum, a braking member in said drum comprising a flexible annulus capable of circumferential expansion, and an arm in said drum adapted to move said annulus in either direction of rotation, and connected to said annulus in a manner to impart a circumferential thrust thereto while leaving an end and intermediate portion on either side to oppose said thrust or to trail depending upon the direction of rotation, said annulus expanding under the action of the friction contact with said drum.

13. In a vehicle spring retarder, a drum, a braking member in said drum comprising a flexible annulus capable of circumferential expansion, an arm for imparting a circumferential thrust to said annulus, and connected in a manner to form the sole connection between said annulus and arm and to provide an end and intermediate portion on either side of said connection to resist movement whereby the thrust causes the annulus to rotate and to expand as the leading end resists movement, to effect a braking action.

14. An energy absorbing device, comprising a friction member and an expansible braking member in frictional bearing with said friction surface, and means connected to and bodily movable with one of said members imparting load directly to said braking members without the interposition of guiding bearings.

15. An energy absorbing device, comprising a friction member and an expansible braking member in frictional bearing one against the other and otherwise free from connection with one another; said members being provided, respectively, with means directly connecting them with two relatively moving bodies to be controlled, one of said means being capable of bodily movement with the member to which it is connected.

Signed at Detroit, Michigan, this 27th day of June, 1925.

MARK HARRIS.